No. 681,241. Patented Aug. 27, 1901.
A. MITSCHERLICH.
PROCESS OF UTILIZING WASTE SULFITE LIQUOR AND PRODUCT THEREFROM.
(Application filed July 28, 1893.)
(No Model.)
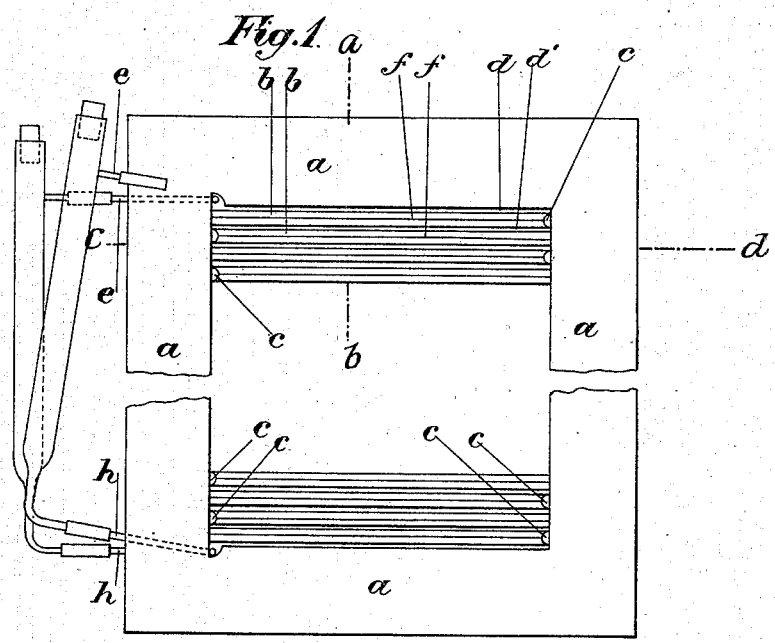
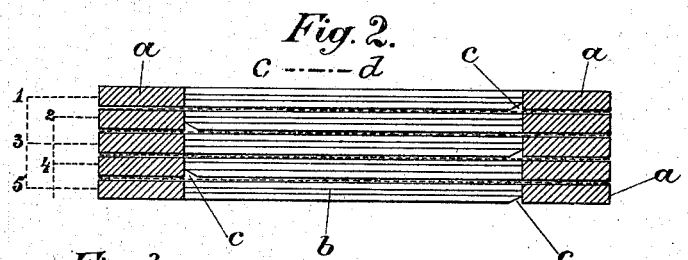
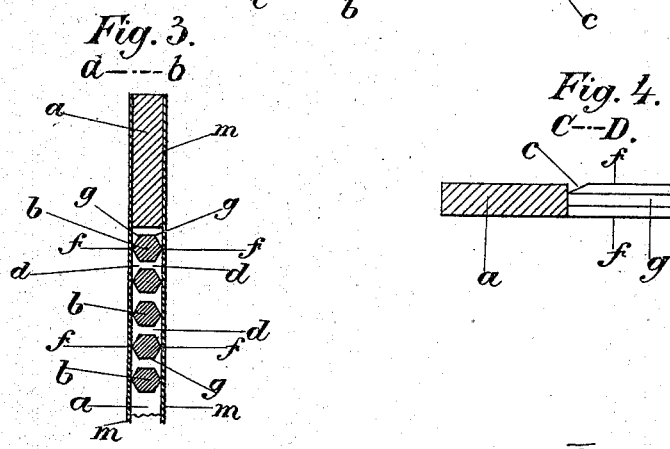
Witnesses:
Inventor:
Alexander Mitscherlich

UNITED STATES PATENT OFFICE.

ALEXANDER MITSCHERLICH, OF FREIBURG, GERMANY.

PROCESS OF UTILIZING WASTE SULFITE LIQUOR AND PRODUCT THEREFROM.

SPECIFICATION forming part of Letters Patent No. 681,241, dated August 27, 1901.

Application filed July 28, 1893. Serial No. 481,763. (No specimens.)

*To all whom it may concern:*

Be it known that I, ALEXANDER MITSCHERLICH, professor and doctor of philosophy, a subject of the King of Prussia, German Emperor, residing at Freiburg, Grand Duchy of Baden, German Empire, have invented new and useful Improvements in Processes for the Utilization of Spent Sulfite Liquors, of which the following is a specification.

My invention has reference to a process for the utilization of the spent liquors obtained in the manufacture of wood-pulp by the so-called "sulfite" process; and it is chiefly intended to devise means whereby these liquors, which heretofore were wasted or if recovered were of but limited applicability, may be so treated in the mill itself as to yield products of increased commercial value and the applicability of which extends to various other arts beyond the manufacture of paper-pulp.

It is well known that the action of the sulfite liquor in the various processes for the employment of this agent upon the wood is based chiefly upon its solvent power on the various organic constituents of the wood which in part form combination with the sulfurous acid. The utilization of these organic bodies which are extracted in the sulfite process and which consist chiefly of resinous matter and combination of acids similar to Arabic acid and other organic acids and of carbohydrates has heretofore been impossible owing to the great amount of impurities in those spent liquors preventing the separation of the organic materials referred to. These difficulties are avoided in my invention by first removing from the liquor all those impurities which will interfere with the separation of the organic constituents, the latter being then converted into a form whereby they can be immediately utilized.

My process is based upon the previous removal of the inorganic constituents of the spent liquor by an addition of lime and the subsequent separation of the organic bodies by dialysis or osmosis. Of inorganic impurities the spent sulfite liquor chiefly contains monosulfites consequent upon the decomposition of the acid liquor during the process, sulfates, and varying small percentages of iron. In order to remove these ingredients and in order to also recover the sulfurous acid from the monosulfites, the heated spent liquor is treated for from about eight to forty hours with slaked lime in suitable tanks. For a liquor having a density of 1.05 about one per cent. of lime has been found sufficient. The proportion of lime varies, of course, with the density of the liquor. The heating may be carried on by injecting steam through a lead coil into the liquor or in any other suitable manner. In the case of very large quantities of liquor being acted upon the heating may sometimes be dispensed with owing to the very slow cooling of the same. The lime decomposes the monosulfites, liberating sulfurous acid, which may reënter the process, and it is also instrumental in precipitating the iron and combines with some of the organic constituents of the liquor. In order to effect a more ready separation of the iron, it is preferable to add small quantities of sulfids—the waste of the manufacture of black ash by the Leblanc process, for instance. The deposit thus obtained, which contains most of the inorganic impurities of the liquor, is removed from the soluble organic constituents, which, besides carbohydrates, contain an agent which acts both as an agglutinant and as a tanning principle and which is of very great commercial importance. In order to free this agent from organic and other foreign bodies, I make use of its property of being not diffusible through an organic septum. The apparatus which I prefer to use in carrying out this part of my invention is preferably so arranged that the liquid which it is desired to submit to the dialytic action flows in the reverse direction to that of the current of water, so as to establish a counter-current of the dialyzing liquid and of the water introduced upon the septum, which effects the separation of the diffusible from the non-diffusible organic constituents of the spent liquor under treatment. I thereby arrive at a far more efficient separation and in a far shorter period than it is possible to effect by using the ordinary methods of dialysis, which would require vessels of very large size and a very long time for operation and at best would yield but very impure products.

In the accompanying drawings I have shown in Figure 1, in elevation, a dialyzer, by way of example, as an illustration of carrying out this part of my process, Figs. 2 and 3 representing details of the apparatus.

The dialyzer referred to consists, mainly, of a rectangular frame $a$, into which are fitted a series of bars $b$, which are placed on edge, as at $f$, so as not to cover the membrane or septum $m$, which is spread over the frame $a$. In order to allow the liquid to pass freely from face to face of the frame, the bars $b$ are placed at some distance apart. Recesses $c$ at the extremities of the bars allow a circulation of the liquid through the several chambers $d$ $d$, formed by the arrangement of these bars between the membranes. Pipes $e$ and $h$ serve for the introduction and for the exit of the liquid. A series of any suitable number of these frames is fixed in a suitable casing and connected with each other, so as to set up a counter-current. This is done, for instance, by connecting the exit-pipes $h$ to the entrance-pipes $e$ of the alternating frames, the two systems thus formed being fed with spent liquor previously treated by lime and the like and with water, respectively, both these liquids entering the system in opposite directions. It has been found by experiment that the best results are obtained by so regulating the flow of the two liquids that after they have gone through the dialyzer the density of the resultant liquid is about equal to one-half of the excess above 1.00 of the density of the spent lye. If a utilization of the diffused liquid is not contemplated, I prefer to have the current of water pass as rapidly as possible through the dialyzer and then allow the dialyzed liquid to run to waste.

The not-diffusible colloid liquid, which has remained on the septum, possesses very valuable properties. It may be employed as a tanning agent and as an agglutinant or adhesive, according to requirements. For use as a tanning agent it is necessary to remove the lime from this liquid, which is done in the usual manner by precipitating the lime by sulfuric or oxalic acid or some other precipitant, the amount of which varies with the percentage of lime contained in the product referred to. The liquid obtained after the separation of the lime may be concentrated to suit the requirements of the trade and will then serve for the tanning of hides in the same manner as the tanning extracts ordinarily employed. The extract may also be used in connection with animal matter, glue, or the like as a sizing agent in the beater, the reaction being similar to that of tanning hides. The glue obtained from horn, pith, hoofs, hairs, and similar material is precipitated by the not-diffusible constituent of the spent lye, preferably with an addition of acid. In the case of animal sizing prepared by dissolving animal nitrogeneous matter in dilute solutions of alkali or carbonates of alkali I may also use the tanning agent in the sulfite liquor without previous purification. The solution of the animal matters may be effected by soaking them in dilute caustic soda and then heating to 212° Fahrenheit or at a lower temperature by heating them with water only under pressure.

While it is necessary to remove the lime for the utilization of the non-diffused constituent as a tanning agent, the treatment with acids tends to destroy the adhesive properties of the same and may upon heating even induce a decomposition of the product. An addition of lime or of alkalis generally, on the other hand, has been found to be necessary to impart to the non-diffusible constituent the properties of an agglutinant and of an adhesive. The alkali may be introduced into the liquid in the form of quicklime or thick lime-paste or of its combinations with the organic constituents of the spent liquor or in form of the spent liquor from manufacturing wood-pulp by the soda process. The spent sulfite liquor after having been purified and treated as above outlined and after subsequent concentration is treated with lime in any form or condition until it ceases to be dissolved, which will result in the formation of a thick and sticky mucilage of very high viscosity of a soft wax-like consistence. As a practical instance of carrying out this part of my invention I may mention that in using lime-paste of about 1.2 specific gravity, I prefer to add about two gallons of the same to three to four gallons of the liquor under treatment and which has been previously concentrated to show a density of about 1.2; but it is obvious that I may vary these proportions to suit existing conditions. It is best to add the lime to the liquor at about 212° Fahrenheit, as at this temperature the reaction takes place more readily. The product thus obtained increases in viscosity by keeping it at a low temperature. It may be used as an agglutinant and as a thickening agent in any case where its alkaline reaction or the presence of lime may be disregarded. Thus it may be used as an excellent agglutinant in the manufacture of bricks from coal dust and similar fuel. For some purposes, where special purity of materials is not wanted, the spent sulfite liquor may even be used in its impure condition. After a previous treatment with lime it is then concentrated in the usual manner to yield a lower grade of agglutinant, which is somewhat hygroscopic, owing to the presence of the diffusible body.

In order to prepare the non-diffusible adhesive agent for stationers' and bookbinders' use, the lime has to be removed and to be substituted by an alkali. This is done by treatment with alkali carbonates, carbonate of soda in particular, which precipitates the lime as carbonate in a granular condition, which may be utilized for any suitable technical purpose. The liquid which now contains the sodium compound of the agglutinant is then evaporated to a thick mass, which is ready for immediate application in the arts. If the iron was not perfectly removed in the previous stages of the process, it may become necessary during the evaporation to add a suitable bleacher to overcome the dark color incident upon the presence of iron. Of such bleaching agents I have found oxalic acid to be best suitable for the purposes of my invention, the amount of acid being of course governed by the amount of iron present and, lastly, by the degree of discoloration of the liquid which it is desired to evaporate.

While the non-diffused constituents are not hygroscopic, the diffusible constituents of the spent liquor, which have passed through the septum in the dialytic process, contain a very hygroscopic fermentable body, from which, by fermentation, alcohol will be obtained, which is separated off by distillation in the usual manner, leaving a residue behind which may be used as a cattle-food. Before setting up fermentation the diffused portion of the liquor will sometimes need an addition of lime or carbonate of lime to bring the acidity down to but a weak acid reaction and a subsequent filtration through coal or sand filters or the like, and it is furthermore preferable to evaporate the liquid to a density of 1.1 before yeast is added for the purpose of fermentation. The alcohol thus produced has a peculiar, not actually disagreeable, odor and flavor.

What I claim, and desire to secure by Letters Patent of the United States, is—

1. The process for the purification of spent sulfite liquors from the manufacture of wood-pulp and for the separation of a tanning and adhesive agent therefrom by first treating said liquor with lime and a suitable precipitant for removing any iron present therein and submitting the resultant liquid to a process of dialysis, the undialyzed portion on evaporation yielding a non-hygroscopic body of adhesive and tanning properties while the dialyzed portion yields a fermentable hygroscopic body.

2. The process for the purification of spent sulfite liquors from the manufacture of wood-pulp and for the separation therefrom of a tanning and adhesive agent by first treating the liquor with an excess of lime and a precipitant for any iron contained in the liquor, submitting said liquor to dialysis, evaporating the undialyzed or non-diffusible liquid and converting the same into combinations with alkalies and alkali earths, the dialyzed or diffusible fermentable liquid being evaporated and treated in any suitable manner, substantially as described.

3. The process for the purification of spent sulfite liquor from the manufacture of wood-pulp and for the separation therefrom of a tanning and adhesive agent by a treatment with lime and subsequent dialysis, precipitating the lime from the undialyzed or non-diffusible liquid and evaporating the same to a suitable consistence, whereby this portion of the liquor acquires tanning properties, while the diffusible portion may be submitted to a process of fermentation, substantially as described.

4. The process for the purification of spent sulfite liquors from the manufacture of wood-pulp and for the separation therefrom of a tanning and adhesive agent by treating the liquor with lime and a precipitant substantially as described, and then passing the resultant liquid through the septum of a dialyzer together with a current of water flowing through the septum in a direction opposite to that of the said liquid and recovering the undialyzed, non-diffusible liquid, substantially as described.

5. As a new article of manufacture, an agglutinant or adhesive agent obtained from spent sulfite liquors resulting from the manufacture of wood-pulp by a treatment with lime and subsequent dialysis, the said agglutinant or adhesive agent showing tanning properties after removal of its alkaline base.

6. As a new article of manufacture, a tanning agent obtained from spent sulfite liquors resulting from the manufacture of wood-pulp by a treatment with lime and dialysis and subsequent removal of the alkaline base of the undialyzed or non-diffusible portion of the liquid by any suitable chemical agent, substantially as described.

In testimony whereof I have signed my name to this specification in the presence of two subscribing witnesses.

ALEXANDER MITSCHERLICH.

Witnesses:
GEORG LAY,
HUBERT TERRY.